UNITED STATES PATENT OFFICE.

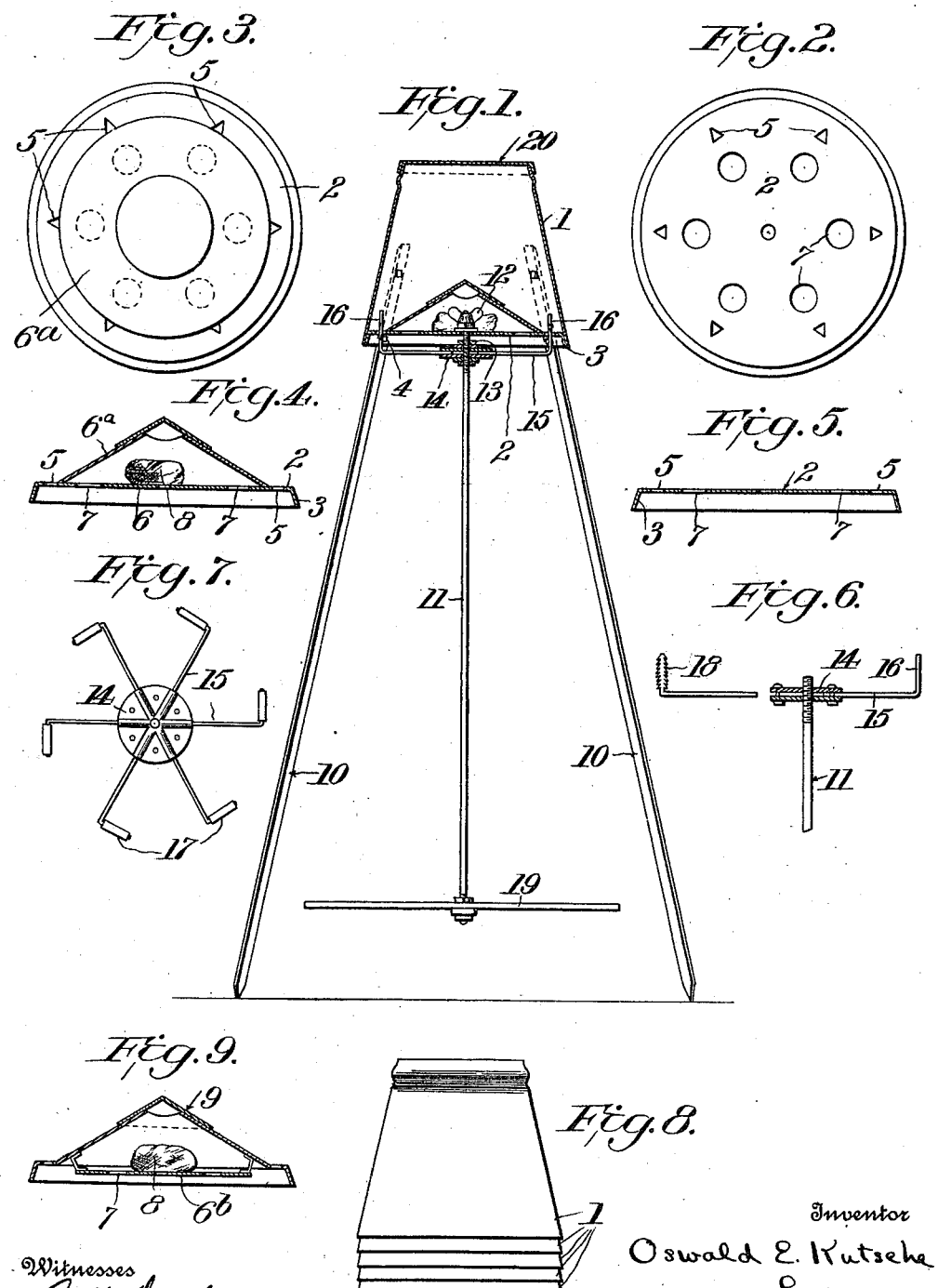

OSWALD E. KUTSCHE, OF PITTSBURG, PENNSYLVANIA.

POULTRY-FEEDER.

989,613.  Specification of Letters Patent.  Patented Apr. 18, 1911.

Application filed August 22, 1910. Serial No. 578,276.

*To all whom it may concern:*

Be it known that I, OSWALD E. KUTSCHE, a citizen of the United States, residing at Pittsburg, in the county of Allegheny and State of Pennsylvania, have invented certain new and useful Improvements in Poultry-Feeders, of which the following is a specification.

This invention relates to poultry feeders; and it consists in a poultry feeding device comprising a feed container having a bottom provided with a plurality of supply orifices and an oscillatory device provided with a plurality of upwardly extending feed fingers passing through said supply orifices into the base of the feed container; all as more fully hereinafter set forth and as claimed.

In a poultry feeder, it is desirable that the device shall be adjustable to feed any character of grain or granular material, that it shall be adapted to give a small but constant and regular feed when in operation and that this feed shall be automatically controlled by the poultry themselves, ceasing when the poultry do not desire food and beginning again when they need food again.

It is the object of the present invention to attain these desirable ends.

In the present invention, a feed hopper adapted to contain any desired amount of corn, wheat, oats, broken grain, etc., is provided with an orificed bottom, the orifices being relatively small and being as many as may be desired. For reasons later appearing, these orifices are best distributed in an annular series near the periphery of a disklike circular bottom. They may be advantageously triangular in shape. Passing through the bottom of the feed container is a rodlike member adjustably secured to such bottom in such a manner that it may in most adjustments be free to swing or oscillate pendulum-wise. It may be secured by a wing nut. When the nut is tightly screwed down thereon the rodlike member may be free to oscillate only to a limited degree while with other adjustments the degree of possible oscillation may be much greater. At its base, this rodlike member carries a buffer member, which may advantageously be a cross-arm of wood or like material, adapted to contact with and be moved by a feeding chicken. Though the feed hopper may be suspended in any desired way, it is more convenient to mount it on legs or standards of such length as to permit fowls to feed therebeneath and the rodlike member should be of such length as will allow the buffer member to clear the ground. At its upper end, the rodlike member is provided with a plurality of prongs or fingers, each prong or finger entering and passing through one of the orifices in the feed container. If the prongs be extended radially outward from the rodlike member and then be given a right-angled bend upward to produce the portion of the finger passing through the aperture, by an up-and-down adjustment of the rodlike member any desired amount of clearance may be given between the bend in the finger and the orifice edges, adapting the device to feed any size of grain. The fingers are best given a roughened surface, as for instance by producing a sort of bur by a chisel on the surface. The burring should open downwardly. The fingers may be provided with a ferrule with a roughened surface; and the ferrules may be of various diameters to enable a further adjustment of the device for different grains. Small ferrules giving a large clearance with the supply apertures may be used with corn; and larger ferrules employed with smaller grain, such as oats. The roughened surface is not indispensable, but it is very advantageous.

In a specific embodiment of my invention, the feeding device may also be provided with means for distributing insecticide powders upon the feeding fowls. As a chicken bends to pick up grain, its neck feathers open out making this an advantageous time to distribute such powders. With the described feed container having an annular peripheral series of supply orifices, it is desirable that the bottom be coned to cause the grain to run down to the orifices and below this coned bottom may be arranged a bag or foraminous container containing the desired insecticide. As the feeding fowls shake the feeder, the powder will sift through the meshes of the bag and down upon such fowls. Under the coned bottom may be a false bottom carrying the bag of insecticide and provided with suitable orifices to allow the powder to fall downward. Or if desired the bottom of the container may be flat, with an annular peripheral series of supply orifices as before, and having also another series of orifices somewhat nearer the center of the container bottom. A removable cone shaped false bottom or distributer having a base of less diameter than the bottom of the container, may be set on the flat bottom, the edges of its base being adjacent the annular peripheral series of supply orifices, and the inner portion of the container bottom covered by the false bottom serving to hold the bag of insecticide.
In the accompanying illustration I have shown, more or less diagrammatically, an embodiment of the described invention.

In this showing, Figure 1 is a vertical section of the apparatus as a whole; Fig. 2 is a plan view of the feeding bottom; Fig. 3 is a plan view of the bottom with the removable false bottom in place; Fig. 4 is a view of the same in vertical section showing a bag of insecticide in position; Fig. 5 is a vertical section of a plane bottom; Fig. 6 is a detail view on an enlarged scale of the top of the rod like member with the feeding fingers, showing the described roughening; Fig. 7 is a view showing a form of finger carrying member; Fig. 8 is a view showing a number of containers nested for shipment; and Fig. 9 is a vertical section of a coned bottom.

In the showing of Fig. 1 element 1 is a container of the form of a truncated cone; a form which is convenient as permitting nesting for shipment (see Fig. 8). The container element is shown as open at top and bottom. At the bottom is a fitted bottom plate 2 having a flange 3. Bolts 4 unite the two elements. The bottom plate may be plane-topped (see Figs. 4 and 5) or it may be coned (see Fig. 9). In either case, it is provided with a peripheral series of supply orifices 5, which are best triangular in shape (see Fig. 2).

In Fig. 4, 6ª is a cone-shaped false bottom resting on the plane bottom 6, having orifices 7, the false bottom serving to distribute feed to the peripheral orifices and forming with the true bottom a chamber in which may be placed a bag 8 of insecticide powder.

With the coned bottom shown in Fig. 9, there may be provided a suitably supported false bottom 6ᵇ having perforations 7 and forming a chamber in which may be placed the bag 8 of insecticide powder. For convenience in filling, the coned portion may be provided with a removable cover 9.

The feed container as a whole is mounted on legs or standards 10. Passing through the bottom is the upper end of a rodlike member 11, secured in position by wing nut 12 resting on said bottom. This arrangement allows the rodlike member freedom to oscillate. Mounted on the rod below the bottom is another nut 13, and below this is secured a plate or similar element 14, carrying fingers or prongs 15 having an upwardly bent portion 16. For convenience in shipment, the fingers may be rotatably positioned in 14 (see Fig. 7) so as to allow them to be turned flat-wise. The fingers may carry the ferrules 17 and are best provided with a roughened surface or bur 18 (see Fig. 6), with the bur pointing downward. By screwing on the wing nut, the rodlike member may be brought upward until the plate engages or nearly engages the bottom, thus restricting the oscillation to any degree desired. In thus bringing upward the plate-like member the bend of the fingers is brought into the orifices, diminishing the clearance therethrough and enabling the device to be used with smaller grain. At its base the rodlike member is provided with a cross-arm or buffer member 19. The feeding poultry displace this buffer member and thereby oscillate the rodlike member and the fingers which it carries, the buffer member and rod-like member thus serving as feed-actuating means. The cross may be a two arm cross or a four arm cross, as may be desired.

The operation of the device is obvious from the foregoing. Assuming 1 filled with grain and the rodlike member 11 lowered to permit free oscillation, the feeding fowls move 19 back and forth and cause the fingers 15 to play in the orifices 5. With the roughened surfaces, the tendency of this movement is to force the grain downward through the orifices. The play of the fingers in the orifices, changing the clearance has the same effect. And with the bag of insecticide in position the shaking of the apparatus causes small portions of powder to sift downward among the feathers of the feeding fowls. When the cross-arm 19 is no longer agitated, the feed of grain stops.

With triangular feed orifices, the apex should be near the periphery. With this form of feed orifice, the length and proportions of the bent feed arms or prongs should be so adjusted as to cause the upward extensions to be positioned substantially at the triangle apex. When small grain is to be fed, the adjustable depending rod is drawn upward by means of the wing nut and the reciprocation of the fingers or arms of the feed orifices is limited to a relatively small up and down play, with the bends of the fingers extending across the greater portion of the orifices and limiting the effective clearance.

What I claim is:—

1. In a poultry feeding device, a feed reservoir having a plurality of orifices therein and a depending oscillatory member carrying fingers registering with and projecting into said orifices and adapted to move relatively thereto.

2. In a poultry feeding device, a feed container provided with a plurality of supply orifices and a depending oscillatory member supported by said container and carrying fingers or prongs registering with and projecting into said orifices and adapted to move relatively thereto, said oscillatory member being adjustable vertically to provide for varying the effective clearance in said supply orifices.

3. In a poultry feeding device, a feed container having a plurality of feed orifices, a depending oscillatory feed-inducing member supported by said container and a plurality of radially disposed arms carried by said oscillatory member, the extremities of said arms registering with and projecting into said orifices and being adapted to reciprocate in said feed orifices when actuated by said oscillatory member.

4. A poultry feeding device comprising a feed container provided with a plurality of feed exits, means for distributing feed to said exits, a depending oscillatory feed actuating member supported by said container and prongs or fingers carried by said oscillatory member and registering with and projecting into said feed exits, said prongs being adapted to reciprocate in said feed exits when actuated by said oscillatory member.

5. A poultry feeding device comprising a feed container provided with a plurality of feed exits, a depending oscillatory feed-actuating member in operative relation to said container and fingers or prongs registering with said feed exits and operatively connected to said oscillatory member in such a manner that they move within said feed exits when said oscillatory member is oscillated.

6. A poultry feeding device comprising a feed hopper having a plurality of feed orifices in the bottom thereof and provided with means for distributing feed to said orifices, a rodlike member adjustably secured at its upper end to said hopper and carrying buffer means at its lower end and being capable of free oscillatory movement, and prongs or fingers secured to said rodlike member at a point somewhat below the hopper bottom and extending radially from said rodlike member and upwardly into said feed orifices.

7. A poultry feeder comprising a feed container provided with a series of feed orifices arranged near the periphery of the container bottom, a distributing member carrying a foraminous container located radially within said series of orifices, a depending rodlike oscillatory member adjustably supported on said container and carrying buffer means on its lower end and a plurality of prongs or fingers attached to said rodlike member below the container bottom and extending radially and upwardly into said feed orifices.

In testimony whereof, I affix my signature in the presence of witnesses.

OSWALD E. KUTSCHE.

Witnesses:
K. P. McELROY,
C. W. FOWLER.

Copies of this patent may be obtained for five cents each, by addressing the "Commissioner of Patents, Washington, D. C."